(12) United States Patent
Chapman (10) Patent No.: US 8,550,632 B2
(45) Date of Patent: Oct. 8, 2013

(54) CAMERA CRANE MOBILE BASE

(75) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 425 days.

(21) Appl. No.: 12/846,711

(22) Filed: Jul. 29, 2010

(65) Prior Publication Data

US 2012/0026467 A1 Feb. 2, 2012

(51) Int. Cl.
*B62D 7/06* (2006.01)
*B62D 21/00* (2006.01)
*G03B 17/00* (2006.01)
*B60K 7/00* (2006.01)

(52) U.S. Cl.
USPC .......... 352/243; 180/6.48; 180/246; 348/373; 396/428

(58) Field of Classification Search
USPC ........ 352/243, 244; 280/47.11, 91.1, 267, 99; 348/373; 396/428; 180/24.07, 60, 6.2, 180/6.24, 6.48, 234, 246, 245, 400, 409
See application file for complete search history.

(56) References Cited

U.S. PATENT DOCUMENTS

| | | | |
|---|---|---|---|
| 4,747,424 A | 5/1988 | Chapman | |
| 4,952,953 A | 8/1990 | Ridderstolpe | |
| 5,312,121 A | 5/1994 | Chapman | |
| 5,490,684 A | 2/1996 | Chapman | |
| D378,156 S | 2/1997 | Chapman | |
| D379,017 S | 4/1997 | Chapman | |
| 5,620,192 A | 4/1997 | Demongin | |
| 5,704,623 A | 1/1998 | Chapman | |
| 6,056,450 A | 5/2000 | Walling | |
| 7,111,574 B2 | 9/2006 | Slatter | |
| 7,134,517 B1 * | 11/2006 | Kaiser et al. | 180/65.6 |
| 7,303,033 B2 | 12/2007 | Chernoff | |
| 7,311,452 B2 | 12/2007 | Chapman | |
| 7,588,104 B2 * | 9/2009 | Ohashi et al. | 180/6.64 |
| 2003/0076480 A1 | 4/2003 | Burbulla | |
| 2006/0012144 A1 | 1/2006 | Kunzler | |
| 2006/0278459 A1 * | 12/2006 | Iwaki et al. | 180/242 |
| 2010/0116572 A1 | 5/2010 | Schmitt | |

OTHER PUBLICATIONS

United States Patent and Trademark Office, International Search Report and Written Opinion for PCT/US11/45250, Dec. 21, 2011.

(Continued)

*Primary Examiner* — William C Dowling
(74) *Attorney, Agent, or Firm* — Kenneth H. Ohriner; Perkins Coie LLP (57) ABSTRACT

A camera crane mobile base has a drive motor assembly at each corner of a chassis. The drive motor assemblies may have an electric motor linked to an axle via gearing, and one or more wheels attached to the axle. The electric motors may be separately controlled to propel and steer the mobile base. A column is pivotally attached to the chassis and pivotal in lateral and longitudinal directions via actuators. The drive motor assemblies may be removed from the chassis for storage or transport. With the drive motor assemblies installed, the mobile base is highly stable and maneuverable. With the drive motor assemblies removed, the chassis is narrow enough to fit through a typical doorway. Steering systems may be linked to the drive motor assemblies at the front and/or rear of the chassis, to allow steering control of the mobile base in corrective, crab and/or round steering modes. The chassis may optionally have an upward curvature from either end towards the center location.

13 Claims, 13 Drawing Sheets

(56) References Cited

OTHER PUBLICATIONS

Written Opinion of the International Searching Authority and International Search Report dated Aug. 11, 2005 in PCT Patent Publication No. W005/085948.

Chapman/Leonard Studio Equipment, Inc. 2008-2010 catalog, pp. 84, 86, 88, 90-97.

Hand-out for Apollo Mobile Crane by Chapman.

* cited by examiner

CAMERA CRANE MOBILE BASE

BACKGROUND OF THE INVENTION

The field of the invention is camera cranes and dollies.

Camera cranes and dollies are used to position and maneuver motion picture cameras, such as motion picture film or digital cameras, HD cameras, and 2D and 3D cameras. Camera cranes typically have a crane arm mounted onto a mobile base or vehicle. The arm can be pivoted or tilted up or down, and panned from side to side, to obtain a desired camera position, while the mobile base remains stationary. Some crane arms can extend and retract with a telescoping movement. To follow a moving subject during filming, or to move the camera around a subject, move in, back-up or move diagonally in any direction, the motion base is pushed over the ground by the filming crew, or the motion base may be self-propelled via an on-board motor.

As filming often takes place on location outside of a studio, the mobile base is advantageously portable, so that, if necessary, it can be readily transported by truck to the filming location. Accordingly, the mobile base is advantageously compact. On the other hand, the mobile base should be able to provide a steady and rigid platform for supporting and moving a crane arm.

The development of remotely controlled cameras has allowed camera operators, cinematographers and directors a wider range of creative options for camera movements, positions and angles. With remote controlled cameras, since there is no camera operator behind the camera, the camera can be moved more quickly. The camera may also be moved into positions that would be unsafe for a camera operator, for example, suspended far out over a tall building. Larger and more versatile camera cranes have correspondingly been designed and built to better match the capabilities of remote control cameras. In turn, more versatile mobile bases are needed for these improved camera cranes. While various mobile camera crane bases having differing features and advantageous have successfully been used in the past, there remains a need for an improved mobile camera crane base which can carry larger crane arms while still being easily transported and maneuvered while in use.

SUMMARY OF THE INVENTION

A new camera crane mobile base providing various advantages and improvements has now been invented. In one aspect, this new camera crane mobile base may have a generally rectangular chassis, with a drive motor assembly at each corner of the chassis. Each drive motor assembly may have an electric motor linked to an axle via gearing, and one or more wheels attached to the axle. An electrical power supply on the chassis can be separately linked to each of the electric motors through a controller allowing separate control of each motor. A column is pivotally attached to the chassis and may be moveable in lateral and longitudinal directions relative to the chassis. A steering system linking the drive motor assemblies at the front and/or rear of the chassis may be provided, to allow steering control of the mobile base in multiple different steering modes.

In another aspect, the column may be located at a front-to-back center location on the chassis, and include at least one telescoping section. A pair of longitudinal actuators, and a pair of lateral actuators, may optionally be attached to the column, to tilt the column as desired.

In an additional aspect, the chassis is rectangular and includes front and rear end tubes, and each drive motor assembly is pivotally attached to a structural fitting which may be inserted into, and removed from, the end tubes. The drive motor assemblies may be removed from the chassis for storage or transport. With the drive motor assemblies removed, the chassis is narrow enough to fit through a typical doorway. As a result, the mobile base may be easily used indoors and outdoors.

Other objects, features and advantages will be apparent from the following detailed description. The invention resides as well in sub-combinations of the elements described.

BRIEF DESCRIPTION OF THE DRAWINGS

In the drawings, the same element number indicates the same element in each of the views.

DETAILED DESCRIPTION OF THE DRAWINGS

Figure 2:
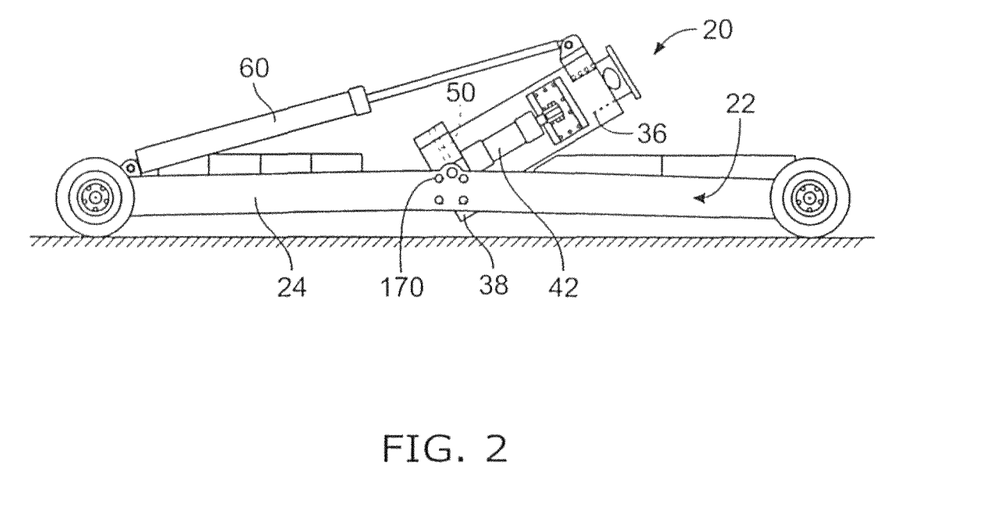
FIG. 2 is a side view now showing the column fully tilted over to a low position.
Figure 3:
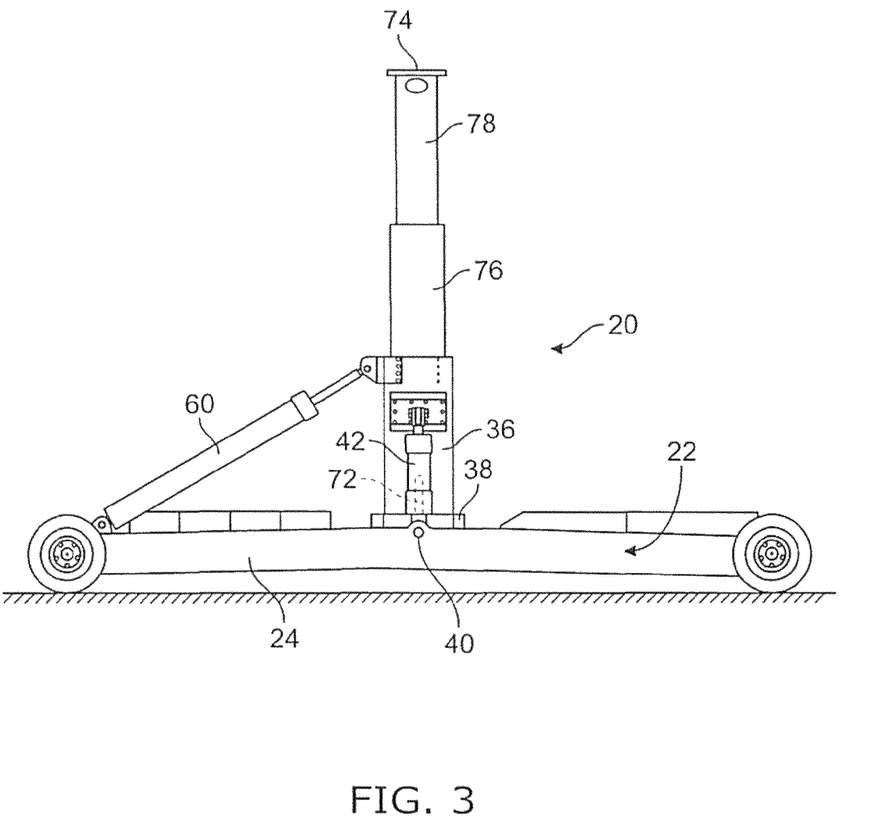
FIG. 3 is a side view showing the column upright, as in FIG. 1, but now with the column telescopically extended up.
Figure 4:
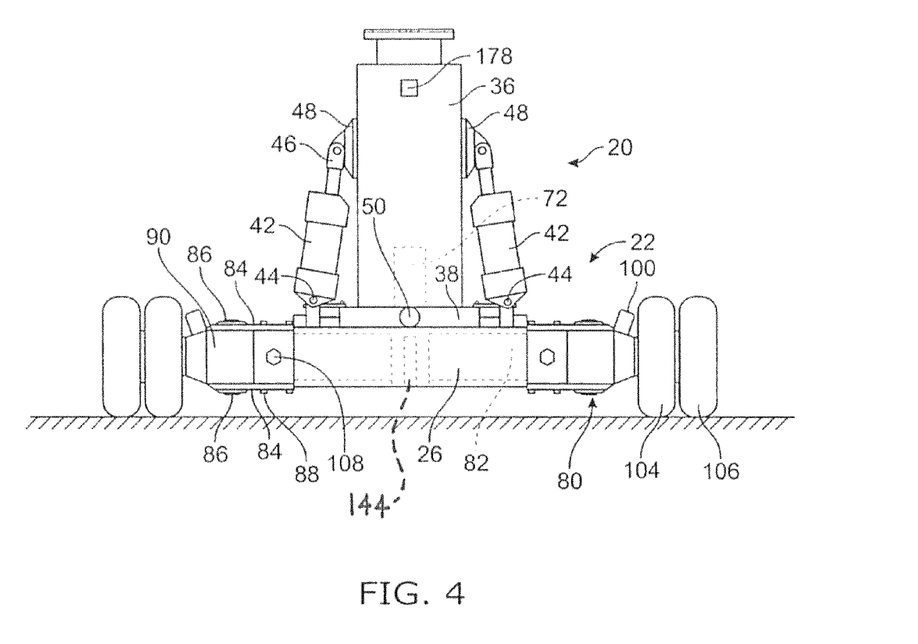
FIG. 4 is a back end view of the mobile base shown in FIG. 1, with various elements omitted for purpose of illustration.

Turning now in detail to the drawings, as shown in FIGS. 1-4 and 6, a new mobile base 20 has a chassis 22. A column 36 is pivotally attached to a column frame 38 via a longitudinal axle 50 shown in FIG. 4. The column frame 38 is in turn pivotally supported onto the chassis 20 via a lateral axle 40. The axles 50 and 40 may extend through or below the lower end of the column 36, or each axle may be provided as two separate axle stubs. With the column pivotally supported by the axles 50 and 40, the column can tilt to the left or right side, and front to back. Referring to FIG. 4, the lower ends or cylinders of left and right side lateral actuators 42 are attached to the chassis 22 on opposite sides of the column 36 via lateral pivot joints 44. The upper end or piston of each of the lateral actuators 42 is attached to a lateral clevis 46 on a side plate 48 of the column 36.

Figure 1:
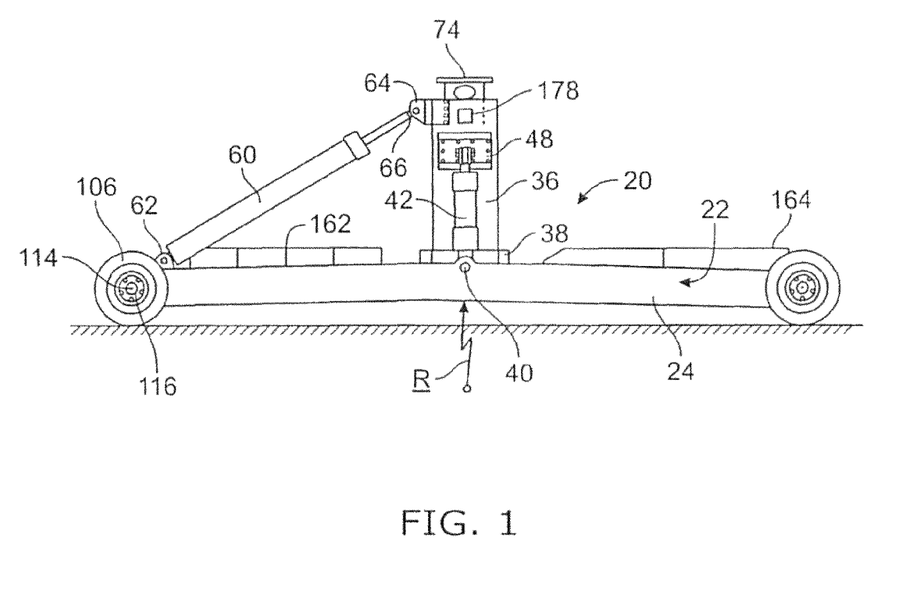
FIG. 1 is a side view of my new camera crane mobile base design, with the column upright.
Figure 6:
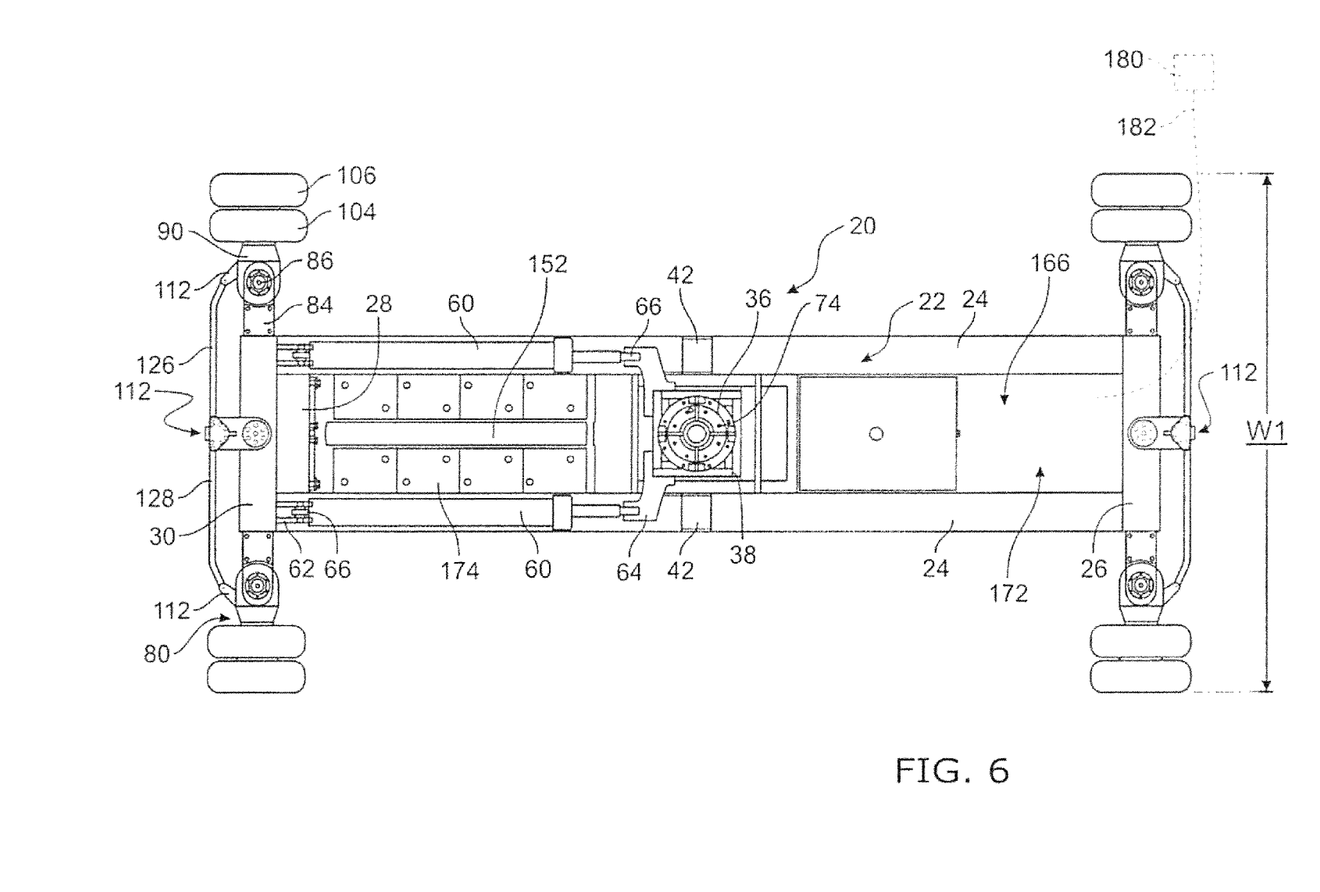
FIG. 6 is a plan view of the mobile base shown in FIG. 1.

As shown in FIGS. 1 and 6, longitudinal actuators 60 are similarly attached to the chassis 22 and the column 36. Specifically, the lower end or cylinder of each longitudinal actuator 60 includes a ball or swivel fitting 66 attached to a front clevis 62 on the chassis 22. The upper end or piston of each longitudinal actuator 60 includes a ball or swivel fitting 66 attached to a column clevis 64. Control of the actuators 42 and 60 accordingly can pivot or tilt the column 36 along two perpendicular axes. The ball or swivel fittings 66 allow the actuators to move with the column without binding. FIG. 1 shows the column 36 in a vertical upright position, with the actuators at nominal starting positions. FIG. 2 shows the longitudinal actuators 60 nearly fully extended. In this position, the column 36 is tilted over towards the back of the mobile base 20, to reduce the overall height of the mobile base 20.

The column 36 may have a fixed length, or it may have a variable length provided using telescoping sections. FIGS. 1, 2 and 4 show a telescoping column 36 in a retracted position. An actuator 72 within the column 36 provides extending, holding, and retracting forces for the telescoping column, if used. FIG. 3 shows the column 36 extended, with column sections 76 and 78 extended and visible. A payload platform 74 at the top end of the column 36 has a hole pattern and/or other elements for attaching a crane arm onto the column 36. For example, a crane arm as described in U.S. Pat. No. 7,311,452, incorporated herein by reference, may be used.

Figure 5:
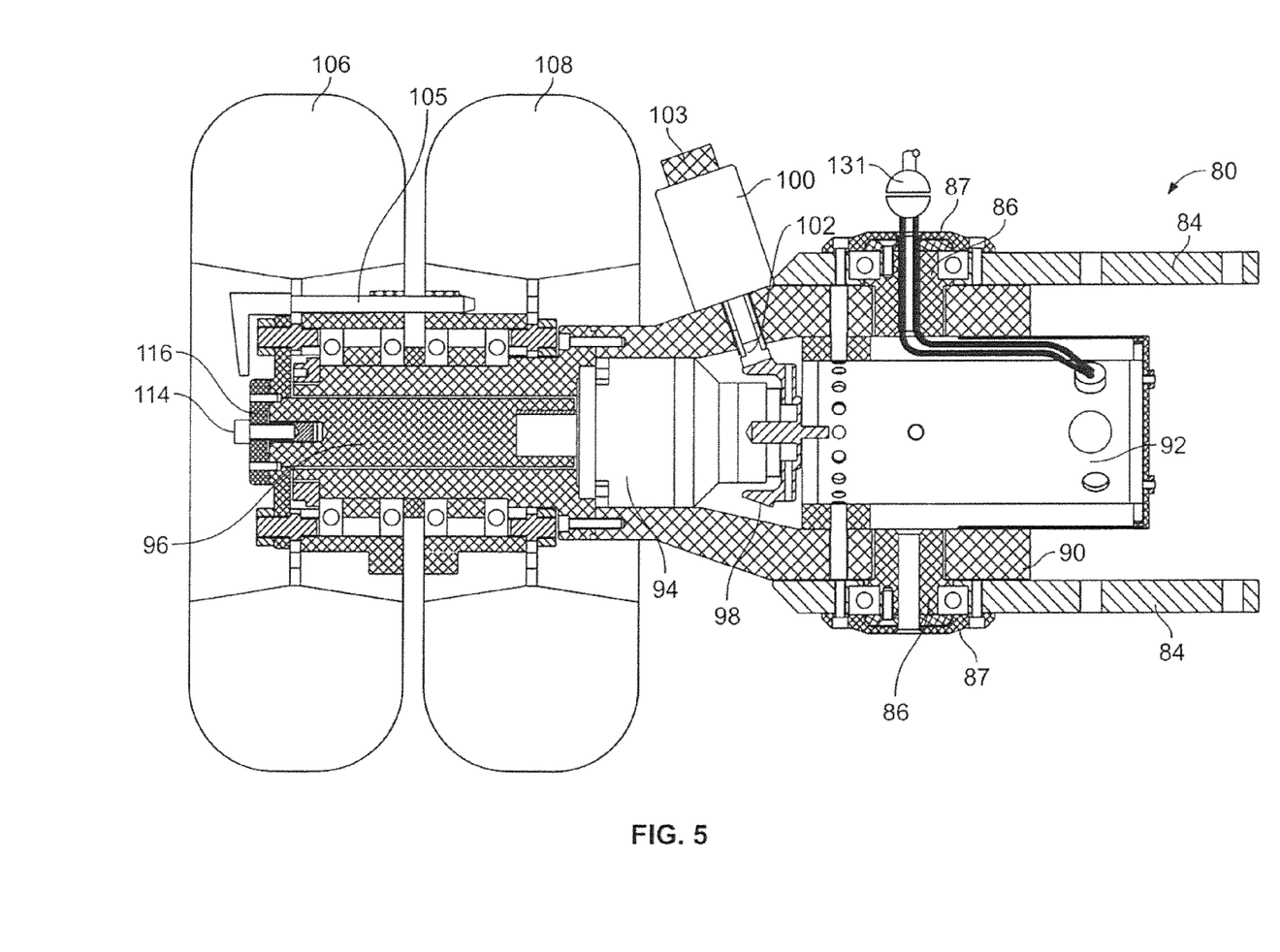
FIG. 5 is an enlarged view of the right side drive motor assembly shown in FIG. 4.

As shown in FIGS. 4 and 6, a drive motor assembly 80 is provided at each of the corners of the chassis 22. The four drive motor assemblies shown in FIG. 6 may be the same. FIG. 5 shows an enlarged view of the drive motor assembly 80 shown in FIG. 4. As shown in FIG. 5, a structural fitting 82 is provided at the inner end of the drive motor assembly 80. The fitting 82 is adapted to fit into or onto the chassis 22. In the specific example shown, the fitting 82 is a tube sized and shaped to slide, with nominal clearance, into the open outer end of the back end tube 26, the front end tube 28 or the rocker tube 30, if used. A motor housing clamping bolt 108 may extend through a standoff 119 inside of the tubes 26 and 30 and thread into a rear nut 118. Tightening the clamping bolt securely clamps and holds the drive motor assembly 80 in place. The standoff 119 avoids crushing the tubes 26 and 30 via over tightening. The fitting 82 may be slotted so that it can pass over the standoff 119.

Figure 7:
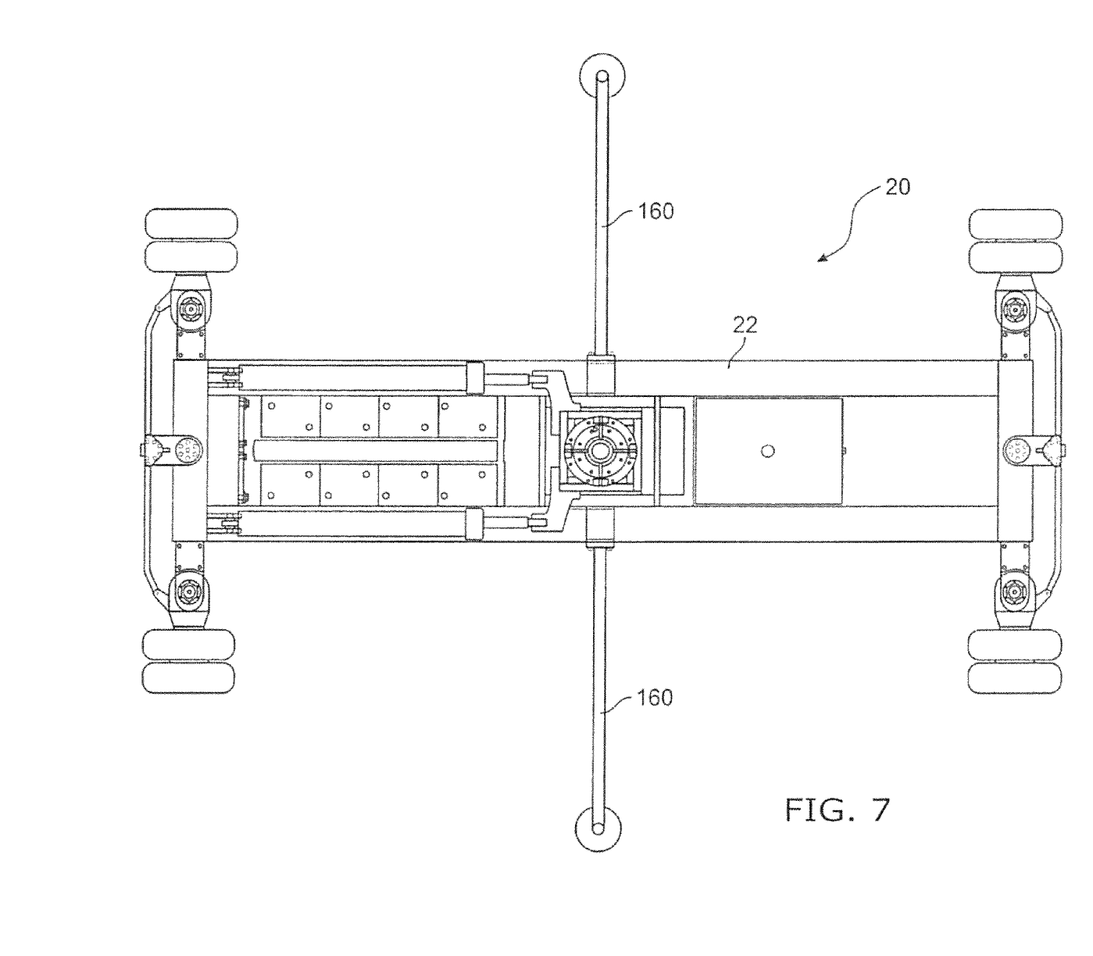
FIG. 7 is another plan view of the mobile base shown in FIG. 1 with outriggers attached.
Figure 8:
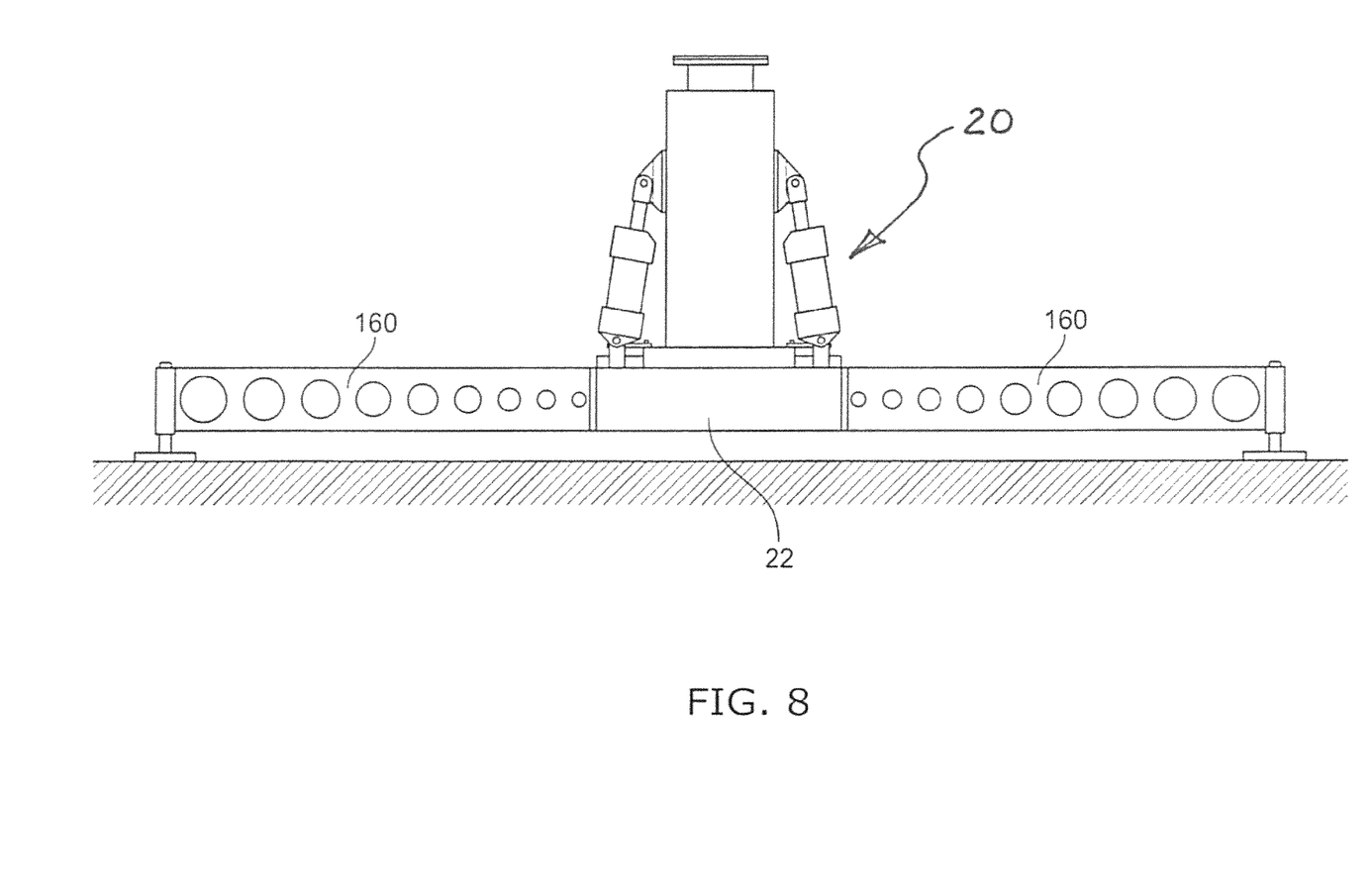
FIG. 8 is a back end view of the mobile base shown in FIG. 7, with various elements omitted for purpose of illustration.
Figure 9:
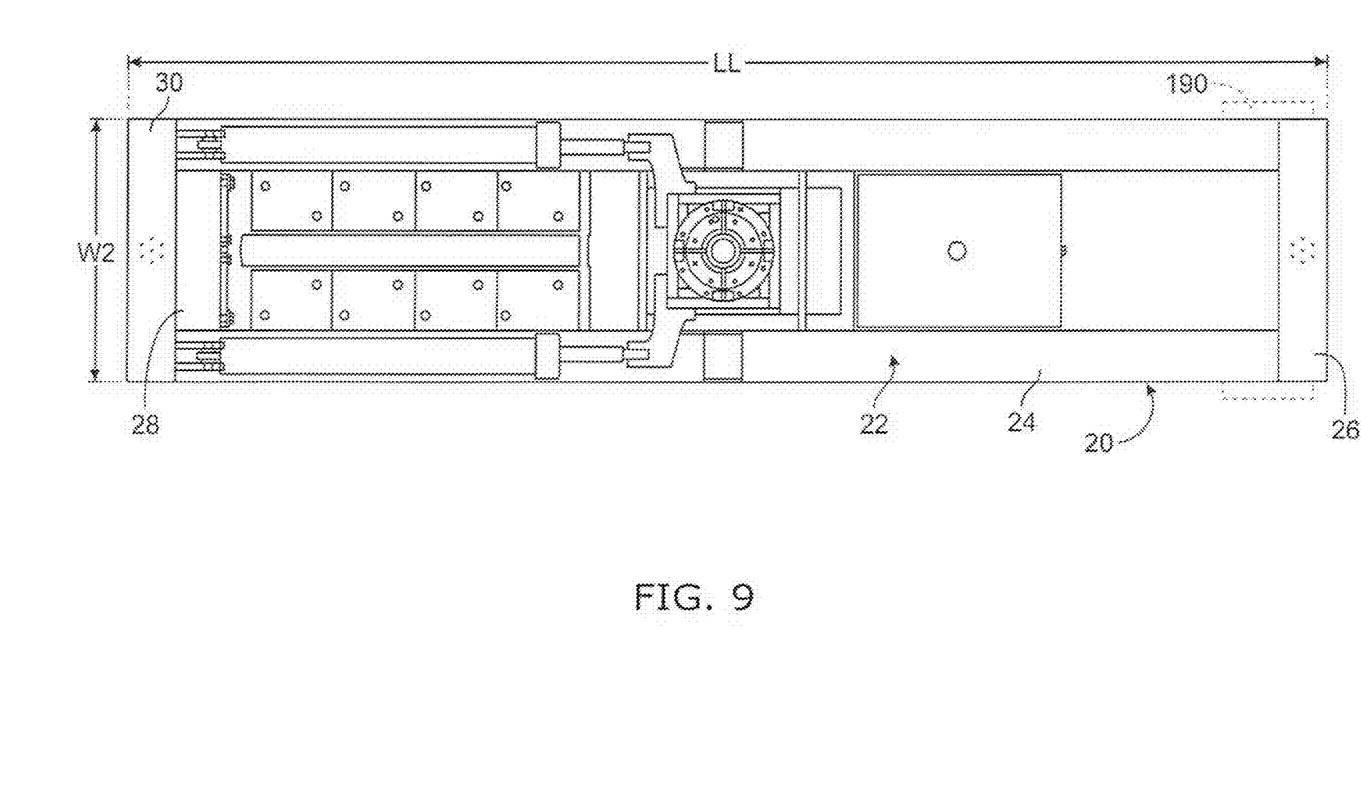
FIG. 9 is a plan view of the mobile base as shown in FIG. 6, but with the drive motor assemblies removed.

As shown in FIG. 6, with the drive motor assemblies 80 installed, the mobile base 20 has a relatively large width W1 to make the mobile base stable. In the example shown, W1 may be about 180 to 250 cm (70-96 inches). As shown in FIG. 9, with the drive motor assemblies 80 removed, the width of the mobile base 20 is greatly reduced down to about 75 to 120 cm (30-48 inches). For additional stability, outriggers 160 may be attached to the chassis 22, as shown in FIGS. 7 and 8. The outriggers 160 may be attached to the chassis 22 using a pattern of bolt holes 170 provided on each side of the chassis, as shown in FIG. 2.

Turning back to FIG. 5, top and bottom vertical axle plates 84 are attached, e.g., using bolts 88, onto the fitting 82. Vertical axle stubs 86 on motor housing 90 are pivotally attached to the vertical axle plates 84 via stub caps 87. An electric motor 92 within the motor housing 90 drives a wheel axle 96 through reduction gearing 94. Inner and outer wheels 104 and 106 are attached to the wheel axle 96. With a design capable of carrying a payload of up to 4550 kg (10000 lbs), an electric motor rated at about 0.4 KW (0.5 HP) may be used. Since the mobile base 20 is generally operated at walking speed, the planetary gearing system 90 has a high ratio, for example 100:1. The torque exerted by each drive wheel assembly 80 is therefore high, for example translating into about 700 pounds force, for a total of up to about 1270 kg force (2800 pounds) of motive force available to propel the mobile base. The mobile base 20 can accordingly propel itself up a steep incline.

Referring still to FIG. 5, a brake system may be provided on each motor housing 90. In one example, the brake system includes an electric brake solenoid 100 including a brake pad 102 on an armature. A spring urges the brake pad 102 against a brake rotor 98 attached to the motor shaft. The solenoid 100 holds the brake pad 102 away from the brake rotor 98 when electric current is provided to the solenoid. If electric current is turned off or interrupted, the solenoid releases the armature and the spring forces the brake pad 102 against the brake rotor 98, to apply braking force. Turning a release knob 103 on the solenoid mechanically holds the armature away from the brake rotor 98. This allows the brake on each motor housing to be released or disengaged without electrical power.

Alternatively, an actuator may be used in place of the solenoid 100, with the actuator applying braking force only when electric current is supplied to the actuator. Since the braking force is multiplied through the gearing system 94, even a nominal braking force applied to the brake rotor 98 can quickly stop rolling movement of the mobile base 20 and hold the mobile base against movement on a steep incline.

Figure 10:
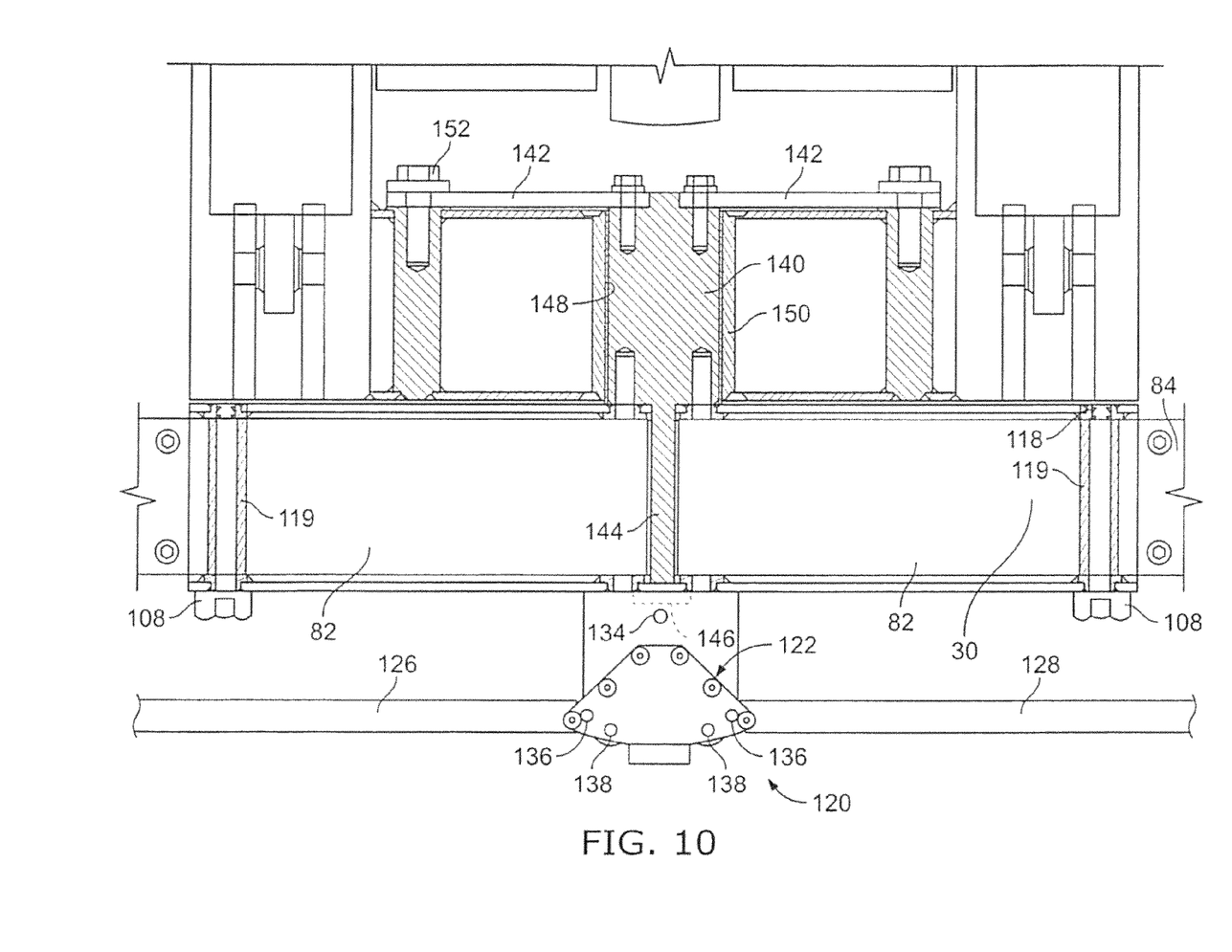
FIG. 10 is a top view, in part section, showing elements of a steering system and a rocker suspension.

Turning momentarily to FIG. 4, the chassis 22 may be formed as a steel weldment including side tubes 24 joined to a back end tube 26 and a front end tube 28. A rocker tube 30 may be pivotally attached to the front end tube, as shown in FIGS. 9 and 10 and further described below. As shown in FIG. 1, the side tubes 24 may have a curvature, such as a radius of curvature R. When loaded with a payload crane arm, which may weigh several tons, the curvature avoids sagging at the center of the chassis and provides greater ground clearance at the center of chassis. The tubes 24, 26, 28 and 30 typically have a rectangular or square cross section, although other shapes may be used. Alternatives to tubes, such as I-beams, C-sections, etc. may also be used. Although tubes 26 and 28 are referred to here as back end and front end tubes, respectively, either end of the mobile base may be considered to be a front end or a back end. The steering and performance characteristics of the mobile base 20 may be the same with movement in either direction.

The steering system 120 provides multiple steering modes. These include conventional front corrective steering. In this mode, the rear wheels are locked in the straight ahead position, and the front wheels have corrective steering, where the inner wheel is turned to a sharper angle than the outer wheel, when the base makes a turn. This mode is similar to steering in an automobile, but with more precise geometry. Conventional rear corrective steering is also provided, and is similar to conventional front corrective steering, except that the front wheels are locked straight ahead and the rear wheels have corrective steering. Crab is a third mode of steering, where the wheels at all four corners of the mobile base are all steered at the same angle simultaneously. Round steering is a fourth mode of steering where the wheels are aligned on the same diameter, to allow mobile base to rotate about its center. Straight steering mode is a fifth mode where all wheels are locked in a straight ahead position. A discussion of the geometry of steering modes is provided in U.S. Pat. No. 5,704,623, incorporated herein by reference.

Figure 11:
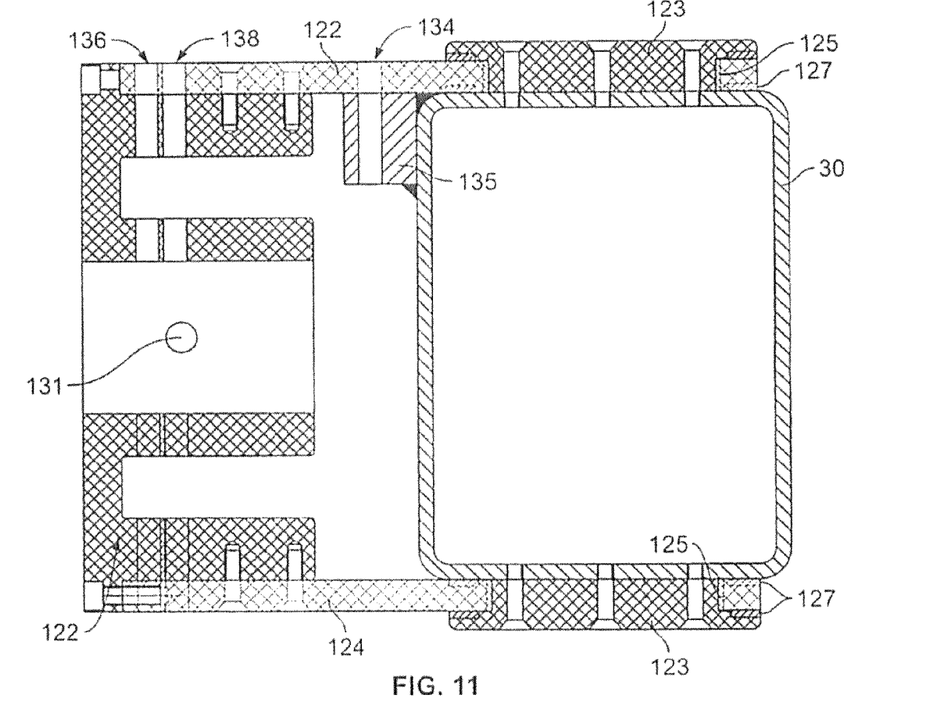
FIG. 11 is partial section view of the steering system elements shown in FIG. 10.
Figure 12:
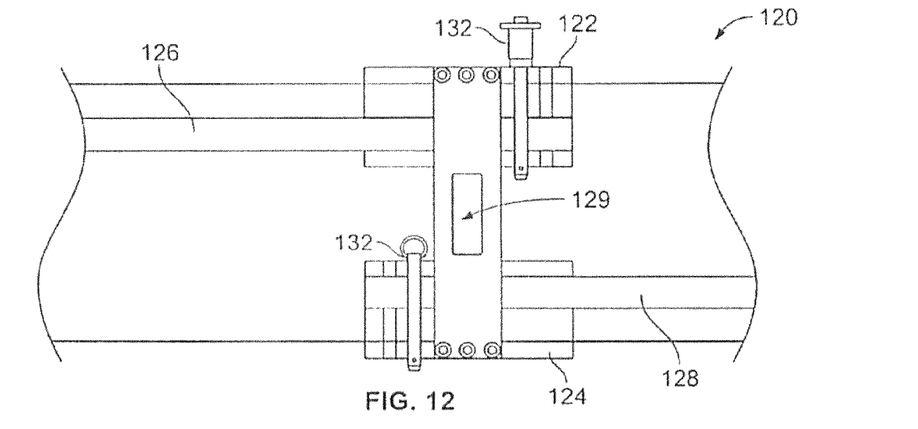
FIG. 12 is a front view of the steering system shown in FIGS. 10 and 11.
Figure 13:
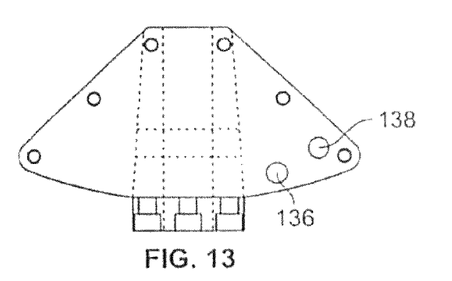
FIG. 13 is a top view of the steering link frame shown in FIGS. 11 and 12.

As shown in FIGS. 6, 10-17, a steering system 120 may be provided at the front and/or back ends of the mobile base 20. The steering system 120 shown includes upper and lower steering compensator plates 122 and 124 having a set of conventional steering mode holes 136 and a set of round steering mode holes 138. The plates 122 are pivotally attached to the rocker tube 30 or the back end tube 26 by plate caps 123 and bushings 125 and 127, as shown in FIG. 11. The outer ends of upper and lower steering bars 126 and 128 are pivotally attached to steering arms 112 on left and right side motor housings 90, as shown in FIG. 6. The inner ends of the bars 126 and 128 are pinned in place into the holes 136 or 138 in the plates 122 and 124 which extend into a steering frame 122 between the plates 122 and 124 (depending on the steering mode selected) using quick release pins 132.

With the bars pinned to the holes 136, the steering system is in a corrective conventional mode. This configuration is also used for crab steering mode. With the steering bars pinned to the holes 138, the steering system is in round steering mode. To place either the front or rear steering system 120 into the straight ahead steering mode, a pin is placed into the straight ahead lock out hole 134 and extends into the lock out block 135 fixed onto the chassis, as shown in FIG. 11. This locks the plates of the steering system in place relative to the chassis 22, fixing the wheels into the straight ahead position. This steering system design 120 may be used for the front wheels, or for the back wheels, or for both the front and back wheels.

Figure 14:
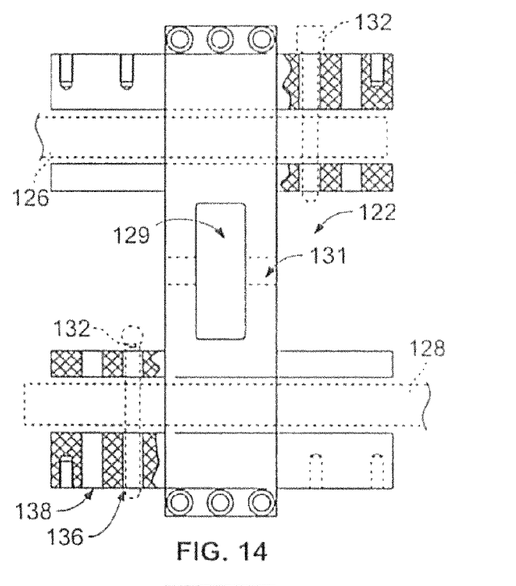
FIG. 14 is a front view of the link frame shown in FIG. 13.
Figure 15:
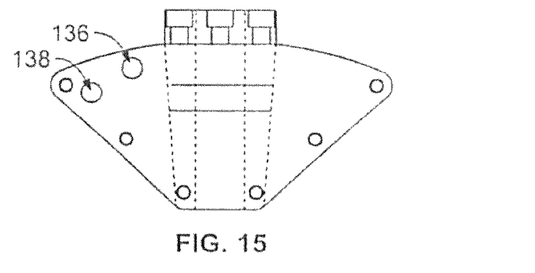
FIG. 15 is a bottom view of the steering link frame shown in FIGS. 11 and 12.
Figure 16:
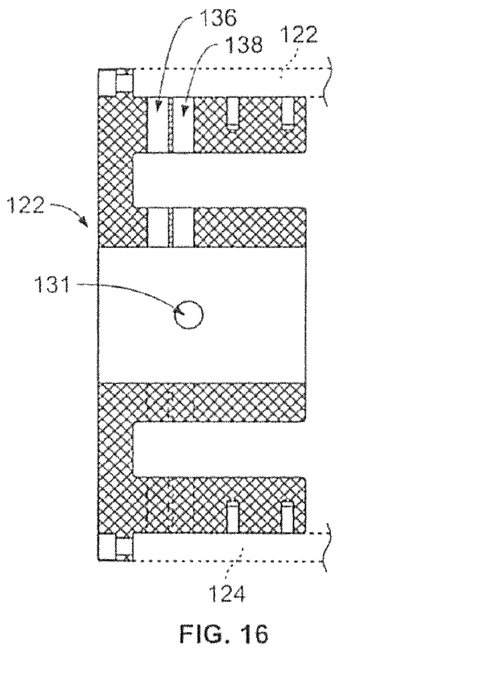
FIG. 16 is a side view of the steering link frame shown in FIG. 14.
Figure 17:
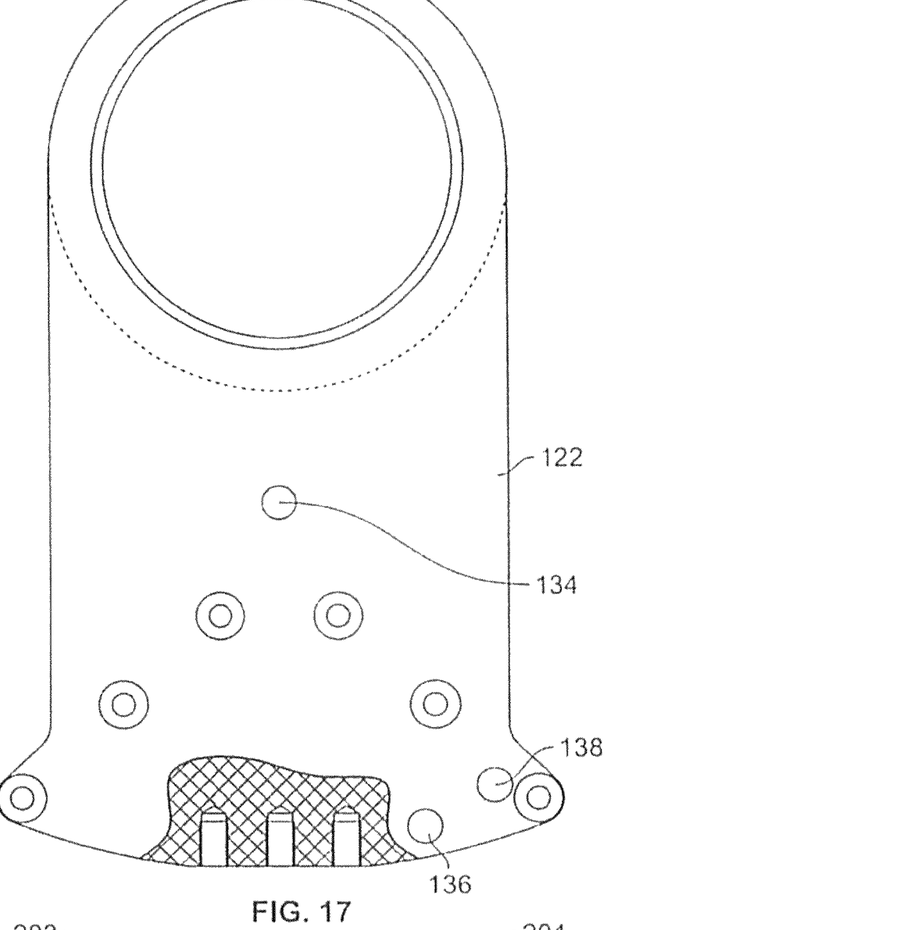
FIG. 17 is a top view of the upper plate shown in FIGS. 11 and 12.

The steering system 120 can be used manually by attaching a steering handle to the compensator plates, with members of the filming crew pulling on the handle to roll the mobile base while also using the handle for steering. The back end of the handle can be inserted through a tow bar opening 129 in the steering frame 122, and locked in place via a pin inserted into a steering bar lock hole 131 in the steering frame 122, as shown in FIGS. 14 and 16. Additional filming crew members may push the mobile base, optionally using a second steering handle attached to compensator plates at the back end of the mobile base. With a gross weight of up to about 4500 kg (10,000 lbs), manually pushing the mobile base 20 typically requires 7-10 crew. On the other hand, using the drive motor assemblies 80 to move the mobile base requires only a single operator, saving time and human labor.

Referring to FIG. 5, when the mobile base is moved manually, the outer wheels are first released from the axle 96 by backing out a wheel release bolt 114. This moves a pin plate 116 outwardly to allow the outer wheel 106 to rotate freely on the axle 96. Freeing the wheels to rotate on the axle avoids trying to back drive the gearing 94 and the motors 92. With the wheels free to rotate on the axle, rather than with the axle, the mobile base may pushed manually, or towed at higher speeds with a tow vehicle.

The inner wheel 104 typically is attached to the axle 96 on a bearing and is not locked to the axle. However, the inner wheel 108 may be linked to the axle by pushing a two wheel drive pin 105 into a hole in the hub or rim of the inner wheel 108. This locks the inner wheel 108 to the outer wheel 106, which in turn in linked to the axle 96 via the pin plate 116. Consequently, both the inner and outer wheels are then both driven by the motor 92.

The steering system 120 mechanically forces the left and right side wheels into steering angles that track precisely with the path of movement, to avoid wheel scrubbing, skidding, and rolling friction. Precise wheel tracking is achieved regardless of the power provided to the motors 92, because the relative steering angles of the inner wheels and the outer wheels is set by the steering system. Using a control system having steering angle sensors, wheel speed sensors, and an appropriate computer and feedback control system, in some designs, the steering bar links 126 and 128 may be removed, with steering then performed only by varying the relative speeds of the motors 92.

As shown in FIG. 10, a rocker tube 30 may be pivotally attached to a front end tube 28 of the chassis 22. In this design, the rocker tube 30 may be attached onto a rocker axle 140 having a rocker plate 144 extending centrally into the rocker tube 30. The rocker plate 144 provides a mechanical stop inside the rocker tube 30 for the inserts or fittings 82 of the drive motor assemblies 80. A bushing 148 is provided in between a cylindrical shaft section of the rocker axle 140 and a shaft section housing 150.

The inner ends of rocker axle plates 142 are bolted onto the back end of the rocker axle 140. Lock out bolts 152 extend through curved slots in the outer ends of the rocker axle plates 142. With the lock out bolts 152 released, the rocker axle 140 and the rocker tube 30 can pivot relative to the chassis 22. With the lock out bolts 152 tightened, the rocker axle 140 and the rocker tube 30 are rigidly joined to the chassis and cannot pivot. This can add stability when the mobile base 20 is stationery and providing a fixed base. With the lock out bolts 152 released, the rocker axle allows the mobile base 20 to simulate a three-point suspension, with all wheels at all four corners of the chassis in contact with the ground, even where the ground is uneven. Pivoting movement of the rocker tube 30 is limited by the ends of the slots in the rocker axle plates 142 coming into contact with the lock out bolts. The nuts 118 towards the outer ends of the rocker tube 30 may be located in slots cut into the front end plates of the side tubes 24, to also provide hard stops limiting pivoting movement of the rocker tube 30.

Referring to FIG. 6, the actuators 42, 60 and 72 may be hydraulic actuators. The mobile base 20 may include an on-board hydraulic system 172 connected via hydraulic lines to these actuators. The hydraulic system 172 typically includes one or more hydraulic oil storage tanks, pumps, valves, accumulators, etc. The mobile base 20 may also include an electrical system 166 including multiple batteries 174 to provide an on-board power source for powering the motors 92, as well as electrical components in the hydraulic system 172, such as an electric motor driving a hydraulic pump. The electrical system may also include various electrical components such as switches, controls, indicators, etc. The hydraulic and electrical system components are located on or in the deck of the chassis, and may be covered by front and rear deck covers 162 and 164.

As shown in FIG. 6, a control box 180 is connected to the electrical system 166 by a cable. The control box typically includes a computer controller. The control box may include a first joystick controlling the front motors 92 and a second joystick controlling the rear motors 92. Deflecting the joystick to the front or to the rear drives both the left and right side motors in the corresponding direction. Deflecting the joystick to either side causes the left and right side motors to rotate at different speeds, causing the controlled set of wheels to turn to the left or to the right, with the steering angle of each wheel mechanically controlled via the geometry of the steering system.

In use, a crane arm is attached to the payload platform 74. Various types of fixed length, segmented, or telescoping crane arms may be used. The payload on the camera platform may include various types of cameras and camera equipment, with or without a human camera operator also on the camera platform. The column 36 may be automatically leveled via a feedback loop including attitude sensors 178 on the column and corrective movements applied by the actuators 42 and 60 via the controller 180. Optionally, the column may be tilted via the actuators into a non-vertical position to achieve a desired camera position or movement. In general, the person operating the mobile base 20 walks behind the mobile base, with the control box held onto the operator using a belt or harness. This leaves both hands of the operator free to operate the joysticks and/or other controls and switches on the control box. The drive motor assemblies 80 and the electrical system 166 may be typically designed so that the mobile base has a top speed of 1.6 to 5 km/hour (1-3 mph), i.e., a relatively slow walking speed.

Especially for sound stage use, where the floor is even and uniform, the steering systems 120 may be engaged, and the rocker tube 30 locked out, for smooth and quiet movement. For use on rougher surfaces, such as on outdoor pavement, roadways, grass, sand, etc., use of the steering systems 120 may or may not be used, and the rocker tube 30 may be unlocked to provide greater stability over uneven ground.

To move the base 20 through a relatively narrow opening, such as a doorway, the actuators 60 can be fully extended. This tilts the column far over rearward, so that height or the mobile base 20 is reduced. The drive motor assemblies 80 may also be removed from the chassis, to reduce the width of the chassis and allow it to fit through a typical doorway. The drive motor assemblies 80 can be removed by jacking up the front end of the chassis. The release bolts 108 are loosened or removed. The steering bars 126 and 128 are removed by releasing the quick release pins 132. The electrical cable connecting into the motor housing of each drive motor assembly is detached via a connector pair 131. The two front drive motor assemblies 80 are then pulled out sideways to withdraw the fitting 82 from the end of the tube. The front end of the chassis is then jacked down onto a set of caster wheels 190, shown in FIG. 9. The rear motors 92 may then be energized to push the chassis through the doorway. The front drive motor assemblies are re-installed and the same procedure is then performed at the back end of the chassis. The front motors 92 can then be energized to pull the chassis forward and entirely through the doorway. The rear drive motor assemblies are then reinstalled. The chassis may alternatively simply be pushed, with sufficient force applied, instead of separately using the front and rear motors 90 to move the chassis.

Figure 18:
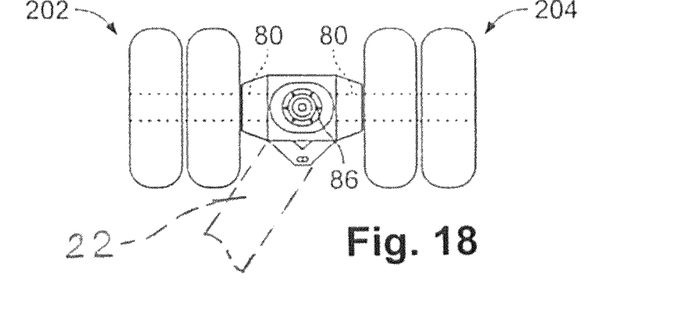
FIG. 18 is a plan view of an alternative drive wheel assembly arrangement.

Referring to FIG. 5, as the motor 92 drives the axle 96, a reaction force exerts a turning moment about the vertical axis passing centrally through the vertical axle stubs 86, even when the mobile base 20 is driven straight ahead. The steering bars 126 and 128 exert an opposite moment. In an alternative design as shown in FIG. 18, a pair of drive motor assemblies 80 are located on opposite sides of the axle stubs 86. In this design, the turning moment about the axle stubs is avoided, although the steering geometry of the inner and outer wheel sets 202 and 204 is less precise. The chassis 22 must also be raised or modified to provide clearance for the inner set of wheels.

Thus, a novel camera crane mobile base has been shown and described. Many changes and substitutions may of course be made without departing from the spirit and scope of the invention. The invention, therefore, should not be limited, except by the following claims and their equivalents.

The invention claimed is:

1. A mobile base, comprising:
    first and second side tubes joined to first and second end tubes forming a substantially rectangular chassis;
    first, second, third and fourth drive motor assemblies at first, second, third and fourth corners of the rectangular chassis, respectively, with each drive motor including a structural fitting and a motor housing pivotally attached to the structural fitting, with the motor housing including an electric motor linked to an axle via a gear reduction, and at least one wheel attached to the axle;
    the structural fitting of the first and second drive motor assemblies slidably positioned into opposite ends of the first end tube, and the structural fitting of the third and fourth drive motor assemblies slidably positioned into opposite ends of the second end tube;
    an electrical power supply on the chassis separately connected to each of the electric motors through a controller allowing separate control of each motor;
    a column pivotally attached to the chassis;
    one or more lateral actuators attached to the chassis and to opposite sides of the column, for pivoting the column laterally, and
    one or more longitudinal actuators attached to the chassis and to the column, for pivoting the column longitudinally, with the column having first height when the longitudinal actuators are at a first position, and the column having a second height when the longitudinal actuators are at a second position, and with the second height less than 70% of the first height.

2. The mobile base of claim 1 with the second height less than 60% of the first height.

3. The mobile base of claim 1 with the column including one or more telescoping sections extendible to increase the height of the column by at least 100%.

4. The mobile base of claim 1 with the chassis having a length more than four times greater than the width of the chassis.

5. The mobile base of claim 1 further comprising caster wheels adapted to support the chassis when the drive motor assemblies are removed from the chassis.

6. The mobile base of claim 1 wherein removing drive motor assemblies from the chassis reduces the width of the mobile base by at least 50%.

7. The mobile base of claim 1 further including a clamping bolt extending through the standoff in the first end tube, and a slot in the structural fitting to allow the structural fitting to pass over the standoff.

8. The mobile base of claim 1 further comprising axle stubs on the motor housing, with the axle stubs attached to axle plates on the structural fitting via bearings.

9. The mobile base of claim 1 with the column substantially at a front-to-back center location on the chassis, and with the chassis curving upward towards the center location.

10. The mobile base of claim 1 with the first end tube comprising a cross member pivotally attached to a front end of the chassis.

11. The mobile base of claim 1 further comprising a brake assembly in each drive motor assembly, with each brake assembly including a solenoid linked to a brake pad, and a brake rotor attached onto a shaft of the electric motor, with the brake pad withdrawn from the brake rotor when the solenoid is energized and with the brake pad engaging the brake rotor when the solenoid is not energized.

12. The mobile base of claim 1 with the controller comprising a walk-behind control box linked to the electrical power supply via a cable, and a harness on the control box to support the control box on a user.

13. The mobile base of claim 1 with the controller comprising a control box linked to the electrical power supply via a cable, and with the control box having a first joystick controlling the motors at the front of the mobile base, and a second joystick controlling the motors at the rear of the mobile base.

* * * * *